(12) United States Patent
Miletich

(10) Patent No.: US 11,312,432 B2
(45) Date of Patent: Apr. 26, 2022

(54) GOOSENECK TRAILER WITH A GUIDE FOR ALIGNMENT

(71) Applicant: Richard George Miletich, Morgan Hill, CA (US)

(72) Inventor: Richard George Miletich, Morgan Hill, CA (US)

(*) Notice: Subject to any disclaimer, the term of this patent is extended or adjusted under 35 U.S.C. 154(b) by 0 days.

(21) Appl. No.: 17/160,341

(22) Filed: Jan. 27, 2021

(65) Prior Publication Data

US 2021/0403104 A1 Dec. 30, 2021

Related U.S. Application Data

(63) Continuation-in-part of application No. 16/558,753, filed on Sep. 3, 2019, now Pat. No. 10,583,704.

(60) Provisional application No. 62/966,217, filed on Jan. 27, 2020.

(51) Int. Cl.
*B62D 53/08* (2006.01)

(52) U.S. Cl.
CPC .................. *B62D 53/0842* (2013.01)

(58) Field of Classification Search
CPC ....... B62D 53/0842; B60D 1/363; B60D 1/36
See application file for complete search history.

(56) References Cited

U.S. PATENT DOCUMENTS

| | | | | |
|---|---|---|---|---|
| 4,560,183 A * | 12/1985 | Cook | ..................... | B60D 1/363 280/477 |
| 4,871,185 A * | 10/1989 | Chakroff | ................ | B60D 1/363 280/477 |
| 5,114,170 A * | 5/1992 | Lanni | ..................... | B60D 1/363 280/477 |
| 5,465,992 A * | 11/1995 | Anderson | .............. | B60D 1/363 280/477 |
| 5,529,330 A * | 6/1996 | Roman | ..................... | B60D 1/36 280/477 |
| 5,927,742 A * | 7/1999 | Draper | ................... | B60D 1/363 280/477 |
| 6,102,422 A * | 8/2000 | Damron | ................ | B60D 1/363 280/477 |
| 6,179,318 B1 * | 1/2001 | Howard | ................ | B60D 1/363 280/477 |
| 6,796,573 B2 * | 9/2004 | Beaudoin | ............... | B60D 1/363 280/477 |
| 7,131,658 B2 * | 11/2006 | MacKarvich | .......... | B60D 1/065 280/477 |
| D646,209 S * | 10/2011 | Story | .......................... | D12/161 |

(Continued)

*Primary Examiner* — Minnah L Seoh
*Assistant Examiner* — Michael R Stabley
(74) *Attorney, Agent, or Firm* — Barry Choobin; Patent 360

(57) ABSTRACT

A gooseneck trailer having a coupler attached to its neck. The coupler having a recess at its lower end, wherein the diameter of the recess is slightly larger than a diameter of the hitch ball, thus permitting the coupler to receive the hitch ball. The gooseneck trailer further comprises a guide attached to the lower end of the coupler over an exposed area around the recess. The guide having a round arch portion and a pair of prongs. The round arch having a crown portion and a pair of haunches. The radius of the curvature of the crown of the round arch is proportional to the radius of the hitch ball. The pair of prongs are continuous with the pair of haunches, wherein the crown portion, the two haunches, and the two prongs are integral.

17 Claims, 3 Drawing Sheets

(56) References Cited

U.S. PATENT DOCUMENTS

| | | | | |
|---|---|---|---|---|
| 8,096,572 B1* | 1/2012 | Greene | ............... | B60D 1/363 |
| | | | | 280/507 |
| 8,286,986 B2* | 10/2012 | Drake | ............... | B60D 1/46 |
| | | | | 280/490.1 |
| 8,919,804 B2* | 12/2014 | Svihla | ............... | B60D 1/363 |
| | | | | 280/495 |
| 9,132,707 B2* | 9/2015 | LaPrade | ............... | B60D 1/488 |
| 9,630,464 B2* | 4/2017 | Hochanadel | ............... | B60D 1/065 |
| 10,583,704 B1* | 3/2020 | Miletich | ............... | B60D 1/065 |
| 2006/0097480 A1* | 5/2006 | Hegefeld | ............... | B60D 1/363 |
| | | | | 280/477 |
| 2006/0267310 A1* | 11/2006 | Richardson | ............... | B60D 1/363 |
| | | | | 280/477 |
| 2007/0114760 A1* | 5/2007 | Hegefeld | ............... | B60D 1/363 |
| | | | | 280/477 |

* cited by examiner

GOOSENECK TRAILER WITH A GUIDE FOR ALIGNMENT

CROSS-REFERENCE TO RELATED APPLICATIONS

This application claims priority to a U.S. provisional patent application Ser. No. 62/966,217, filed on Jan. 27, 2020, which is incorporated herein by reference in its entirety.

This application is also a continuation-in-part of the U.S. patent application Ser. No. 16/558,753 filed Sep. 3, 2019, which is incorporated herein by reference in its entirety.

FIELD OF INVENTION

The present invention relates to a gooseneck trailer, and more particularly, the present invention relates to a gooseneck trailer with a guide that facilitate alignment of the gooseneck relative to the hitch ball.

BACKGROUND

Trailers, commonly used for the transport of goods, are unpowered vehicles that are towed by a powered vehicle, such as a Truck. Hitches of different kinds are known to hook-up a trailer to a powered vehicle. Bumper pull hitch and gooseneck hitch are commonly used trailer hitches. However, the gooseneck trailers having several advantages over the bumper pull trailers are becoming popular.

Gooseneck hitch type of trailers requires a hitch ball installed in a bed of a pickup truck. The tongue or neck of the gooseneck trailer slides over the hitch ball to hook-up the trailer. The neck of the gooseneck trailer generally has a coupler at its lower end. The coupler having a recess to receive the hitch ball. The coupler can also have a suitable latch mechanism to secure the coupler to the hitch ball. To hitch the gooseneck to the hitch ball, the hitch ball is positioned below the coupler, such as the recess of the gooseneck is aligned to the hitch ball. Thereafter, the gooseneck is lowered onto the hitch ball. Once, the hitch ball is received into the coupler, the latch mechanism of the coupler can be engaged to secure the hitch.

Although the gooseneck trailers are becoming more popular, they have one big drawback. Aligning the coupler over the hitch ball typically requires expertise and multiple attempts. Additionally, the help of a second person is generally needed to guide the driver in aligning the truck in position relative to the coupler. In case, when secondary assistance is not available, the driver has to hop in and out of the truck several times maneuvering the hitch, which can be laborious and tiresome.

Thus, an urgent need is there for improved gooseneck trailers that facilitate aligning of the hitch ball in the truck bed relative to the gooseneck.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a gooseneck trailer that facilitate aligning of the hitch ball relative to the coupler.

It is another object of the present invention to provide a gooseneck guide that can retrofit to a gooseneck trailer.

It is still another object of the present invention that the gooseneck guide is economical to manufacture.

It is a further object of the present invention that the gooseneck guide facilitate easier and quicker hitching of the hitch ball to the coupler of the gooseneck trailer.

It is an additional object of the present invention that a pickup truck can be hook-up to the gooseneck trailer by a driver of the truck without assistance.

In one aspect, disclosed is a gooseneck trailer having a vertical coupler attached at its lower end. The coupler having a recess at its bottom, wherein the diameter of the recess is slightly larger than the diameter of the hitch ball, thus permitting the coupler to receive the hitch ball. The gooseneck trailer further comprises a guide attached to the lower end of the coupler over an exposed area surrounding the recess. The guide having a round arch portion and a pair of prongs continuous with the round arch portion. The round arch having a crown portion and a pair of haunches. The radius of the curvature of the crown of the round arch is proportional to the radius of the hitch ball. The pair of prongs are continuous with the pair of haunches, wherein the pair of prongs are of linear geometry and extend outwardly from the pair of haunches. The two prongs can bend outwards away from each other.

These and other objects and advantages of the embodiments herein will become readily apparent from the following detailed description taken in conjunction with the accompanying drawings.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION OF THE PRESENT INVENTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
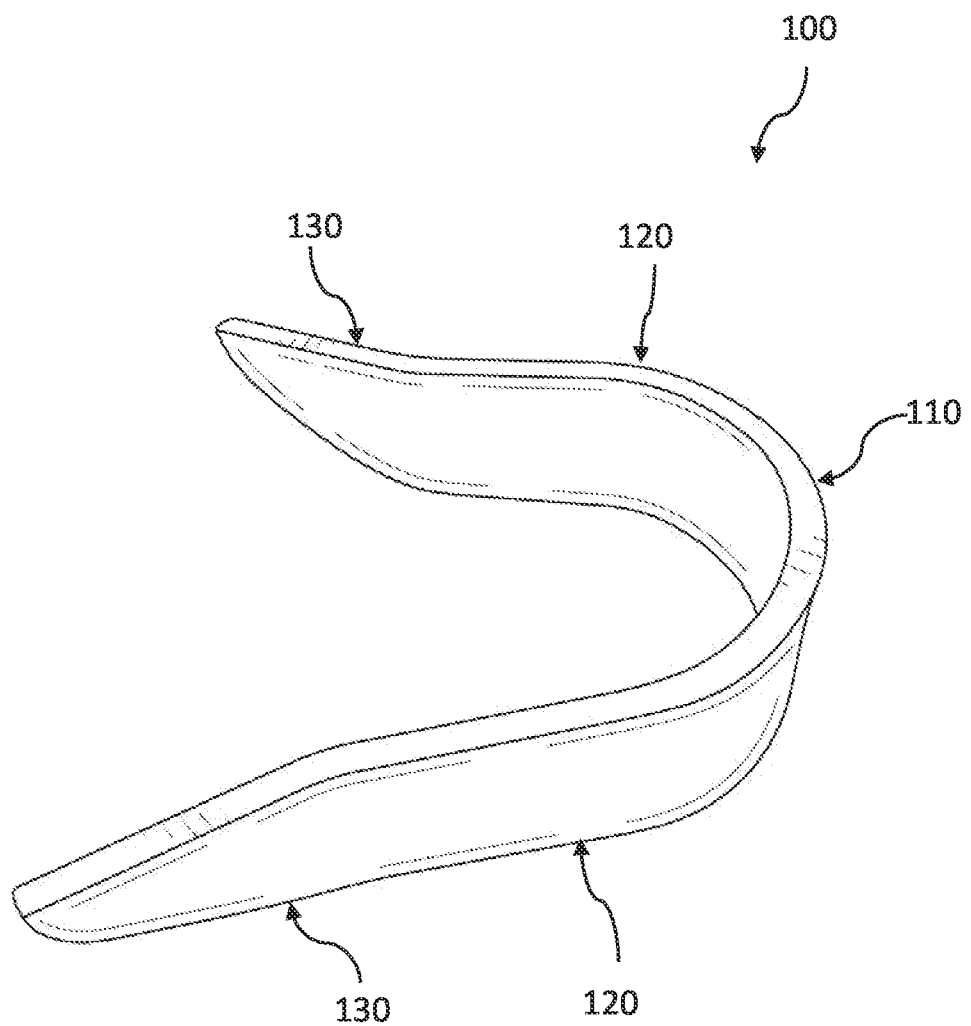
FIG. 1 is a perspective view of the gooseneck guide, according to an exemplary embodiment of the present invention.

The invention is directed to a gooseneck trailer having a gooseneck guide that facilitates a pick-up truck to align the hitch ball relative to the gooseneck trailer for hitching the truck to the gooseneck trailer. Referring to FIG. 1, which shows an exemplary embodiment of the gooseneck guide 100. The gooseneck guide can be divided into a round arch portion and a pair of prongs portion that is continuous with the round arch. The round arch includes a crown portion 110, a pair of haunches 120 that is continuous with the crown portion 110. The crown portion 110, the pair of haunches 120, and the pair of prongs 130 are integral. The crown portion 110 can have a curvature radius that is proportional to the radius of the hitch ball. The pair of prongs 130 can be seen continuous with the pair of haunches 120. The pair of prongs are having a linear profile that extends outwardly from the pair of haunches. The two prongs can bend outwards away from each other and relative to the pair of haunches. In one case, each prong can bend outwards up to 30 degrees. In one case, each prong can bend outwards up to 45 degrees. The guide having a top side and a bottom side defining the thickness of the guide. The thickness can be uniform throughout the length of the guide or narrows down from the crown portion towards the terminating free ends of the prongs. In one case, the round arch portion can be of a uniform thickness, and the thickness of the two prongs gradually narrows down towards the free ends. The gooseneck guide 100 shown in FIG. 1 is having a uniform thickness. The width of the guide can be proportional to the rise of the ball portion of the hitch ball above the base or flatbed of the truck. The width of the guide can be uniform or variable. FIG. 1 shows the round arch portion of the guide having a uniform width. The width of the two prongs gradually narrows down up to the terminal ends. The gooseneck guide can be made from any high strength material, such as hardened steel.

Figure 2:
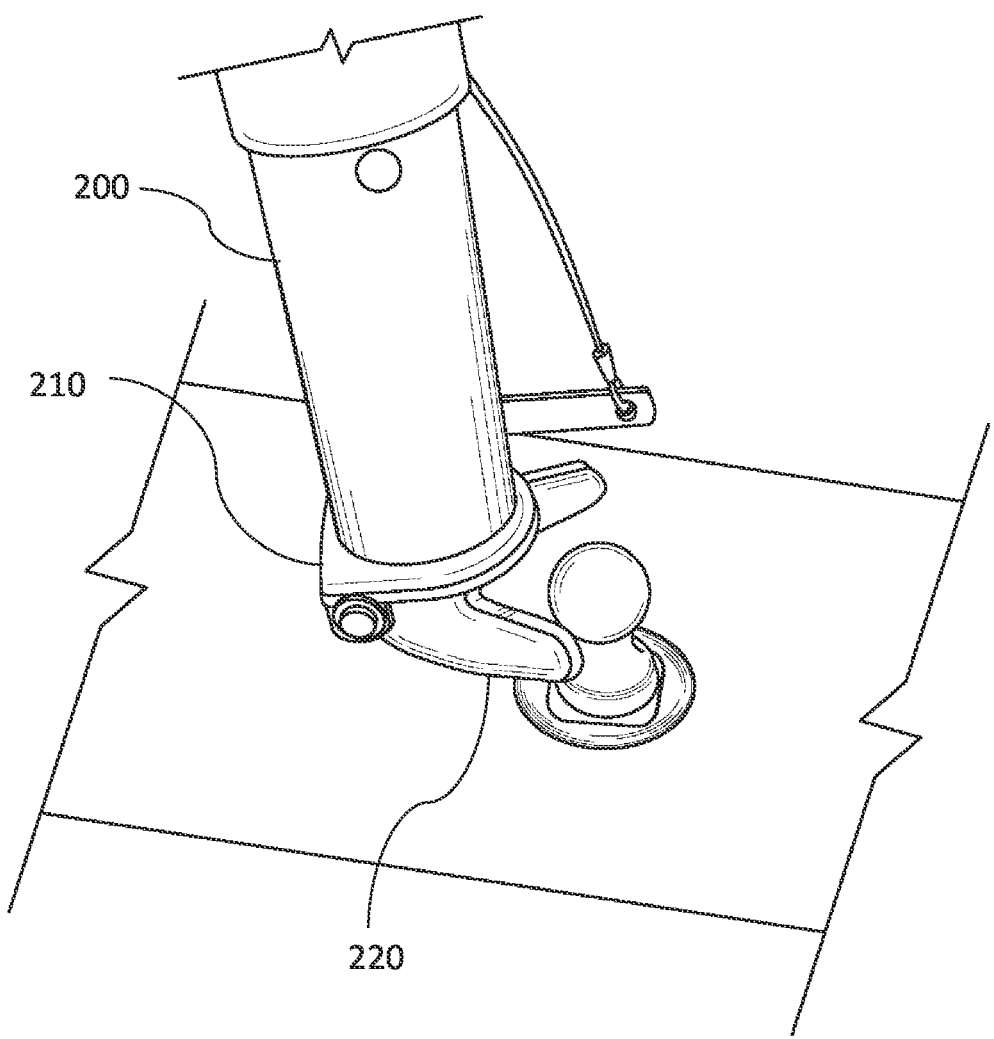
FIG. 2 is a perspective view showing the gooseneck trailer and a hitch ball, according to an exemplary embodiment of the present invention.

The gooseneck guide can be attached to the lower end of the neck of the gooseneck trailer. In case, the neck is having a coupler at its bottom, the gooseneck can couple to the lower end of the coupler. The gooseneck guide can be welded to the lower end of the coupler, wherein the top side of the gooseneck guide can be welded to the exposed lower surface of the coupler. FIG. 2 shows an exemplary embodiment of the gooseneck trailer having the gooseneck guide. FIG. 2 shows a coupler 200 extending from the neck 210 of the gooseneck trailer. The coupler 200 can have a latch 220 that may be self-latching based on spring and can latch to the hitch ball. In case, the coupler is having a latch, the guide can be welded to the latch. One prong 230 of the gooseneck guide can be seen extended away from the lower end of the coupler 200.

Figure 3:
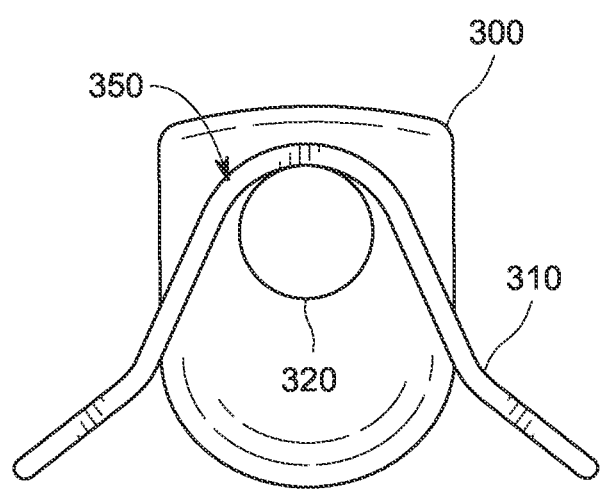
FIG. 3 is a bottom view of the coupler showing the gooseneck guide, according to an exemplary embodiment of the present invention.

FIG. 3 is a bottom view of the coupler 300 showing the gooseneck guide 310 coupled to the lower end of the coupler. The lower end of the coupler 300 can have a recess 320 into which the ball of the hitch ball can be received. The inner dimensions of the recesses can be proportional to the dimension of the hitch ball. For example, the recess can be cylindrical with a semi-spherical inner end that can juxtapose with the hitch ball. The diameter of the recess can be slightly larger than the diameter of the hitch ball. Around the recess 320 can be seen the gooseneck guide 310 welded to an exposed surface of the lower end. In case, the lower end of the coupler is having a latch plate, the latch plate can have an opening continuous with the recess 320, and the guide 310 can be welded to the latch plate. The round arch portion 350 of guide 310 can be seen coupled around the recess 320 and not obstructing the recess 320. Most portion of the round arch portion 350 can be seen welded to the lower end of the coupler and the two prongs extend away from the coupler. FIG. 2 shows one of the two prongs that extend from the coupler. In one case, the two prongs can point towards the trailer, while the crown portion of the guide can face the truck. Alternatively, the prongs can point towards the truck and the crown portion of the guide can face the trailer. Preferably, the prongs can point away from the trailer and towards the truck and the crown portion of the guide can face the trailer To hook-up the gooseneck trailer to the pick-up truck, the driver of the truck can position the truck relative the coupler of the gooseneck trailer, such as the hitch ball is moved towards the coupler when the truck is moved rearwards towards the trailer. The height of the coupler above the ground is such as the lower end of the coupler is just above hitch ball while the gooseneck guide is in level with the height of the hitch ball. The prongs of the coupler points away from the trailer and towards the truck. The truck can be slowly moved rearwards and towards the trailer, bringing the hitch ball towards the coupler. In case, the hitch ball is not lined-up with the coupler, the hitch ball bumps into the gooseneck guide and slides over the prongs and haunch portion of the gooseneck guide towards the crown portion of the guide. The position of the guide is such that when the hitch ball is in contact with the crown portion of the guide, the recess of the coupler is aligned to the hitch ball. Once the crown portion of the guide is juxtaposed to the hitch ball, the coupler can be lowered to hook-up to the hitch ball. The hitch ball can be spherical, elliptical, cube, or cuboid in geometry, and the coupler can have a recess of a geometry commensurate with the geometry of the hitch ball.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A gooseneck trailer comprising:
a coupler having a lower end, a recess in the lower end of the coupler, the recess configured to receive a hitch ball mounted on a flatbed of a vehicle, the recess has a diameter slightly larger than a diameter of the hitch ball;
a latch plate coupled to the lower end of the coupler, the latch plate has an opening continuous with the recess; and
a guide coupled to an exposed surface of the latch plate around the opening, the guide comprising:
a round arch portion comprising:
a crown portion having a curvature radius proportional to a radius of the hitch ball, and
two haunches that extend from the crown portion, wherein the round arch portion is coupled to the latch plate, and
two prongs that extend outwards from the two haunches, wherein the crown portion, the two haunches, and the two prongs are integrally formed in a unitary structure,
wherein the guide is positioned on the lower end of the coupler such that when the crown portion is in contact with the hitch ball, the recess is aligned to the hitch ball.

2. The gooseneck trailer according to claim 1, wherein the two haunches are of a curved geometry.

3. The gooseneck trailer according to claim 2, wherein the two prongs are of a linear geometry.

4. The gooseneck trailer according to claim 3, wherein the two prongs are bent outwardly and away from each other.

5. The gooseneck trailer according to claim 4, wherein each of the two prongs is bent at an angle less than 30 degrees relative to the haunches.

6. The gooseneck trailer according to claim 4, wherein each of the two prongs is bent at an angle less than 45 degrees relative to the haunches.

7. The gooseneck trailer according to claim 1, wherein the guide is made of hardened steel.

8. The gooseneck trailer according to claim 1, wherein the guide is having a uniform thickness, a width of the two prongs narrows down to form pointed ends.

9. The gooseneck trailer according to claim 1, wherein a width of the rounded arch portion of the guide is the same or less than a rise of the hitch ball above the flatbed.

10. The gooseneck trailer according to claim 1, wherein the guide is coupled such that the two prongs point away from the gooseneck trailer.

11. A gooseneck guide assembly for a gooseneck trailer that facilitates aligning of a hitch ball to a coupler of the gooseneck trailer, the gooseneck guide assembly comprising:
a latch plate configured to couple to a lower end of the coupler, the latch plate has an opening continuous with a recess in the lower end of the coupler, the recess is for receiving the hitch ball; and
a guide coupled to an exposed surface of the latch plate around the opening, the guide comprising:
a round arch portion comprising:
a crown portion having a curvature radius proportional to a radius of the hitch ball, and
two haunches that extend from the crown portion, wherein the round arch portion is coupled to the latch plate, and
two prongs that extend outwards from the two haunches, wherein the crown portion, the two haunches, and the two prongs are integrally formed in a unitary structure,
wherein the guide is configured to be positioned on the lower end of the coupler such that when the crown portion is in contact with the hitch ball, the recess is aligned to the hitch ball.

12. The gooseneck guide assembly according to claim 11, wherein the two haunches are of a curved geometry.

13. The gooseneck guide assembly according to claim 12, wherein the two prongs are of a linear geometry.

14. The gooseneck guide assembly according to claim 13, wherein the two prongs are bent outwardly and away from each other.

15. The gooseneck guide assembly according to claim 11, wherein the guide is made of hardened steel.

16. The gooseneck guide assembly according to claim 11, wherein the guide is having a uniform thickness, widths of the two prongs narrows down to form pointed ends.

17. The gooseneck guide assembly according to claim 16, wherein a width of the rounded arch portion of the guide is the same or less than a rise of the hitch ball above a flatbed on which the hitch ball is installed.

* * * * *